United States Patent
Neuenschwander (10) Patent No.: US 7,062,841 B2
(45) Date of Patent: Jun. 20, 2006

(54) METHOD OF MANUFACTURING A FORMABLE LAMINATED STACK IN A PROGRESSIVE DIE ASSEMBLY HAVING A CHOKE

(75) Inventor: Thomas R Neuenschwander, Fort Wayne, IN (US)

(73) Assignee: L.H. Carbide Corporation, Fort Wayne, IN (US)

( * ) Notice: Subject to any disclaimer, the term of this patent is extended or adjusted under 35 U.S.C. 154(b) by 460 days.

(21) Appl. No.: 10/266,366

(22) Filed: Oct. 8, 2002

(65) Prior Publication Data

US 2004/0064936 A1 Apr. 8, 2004

(51) Int. Cl.
*H01F 3/04* (2006.01)
*H02K 1/06* (2006.01)

(52) U.S. Cl. .............. 29/609; 29/596; 29/598; 29/738; 29/742; 29/830; 310/217

(58) Field of Classification Search ............ 29/609, 29/738, 598, 742, 830, 596; 72/379.2; 310/217
See application file for complete search history.

(56) References Cited

U.S. PATENT DOCUMENTS

| | | | |
|---|---|---|---|
| 4,951,377 A * | 8/1990 | Fritzsche | 29/596 |
| 5,208,503 A * | 5/1993 | Hisey | 310/259 |
| 5,583,387 A | 12/1996 | Takeuchi et al. | |
| 5,592,731 A | 1/1997 | Huang et al. | |
| 5,729,072 A | 3/1998 | Hirano et al. | |
| 5,755,023 A * | 5/1998 | Neuenschwander | 29/596 |
| 5,799,387 A | 9/1998 | Neuenschwander et al. | |
| 5,859,486 A | 1/1999 | Nakahara et al. | |
| 6,081,059 A | 6/2000 | Hsu | |
| 6,121,711 A | 9/2000 | Nakahara et al. | |
| 6,127,753 A | 10/2000 | Yamazaki et al. | |
| 6,167,610 B1 | 1/2001 | Nakahara et al. | |
| 6,226,856 B1 * | 5/2001 | Kazama et al. | 29/596 |
| 6,317,962 B1 | 11/2001 | Adachi et al. | |
| 6,323,571 B1 | 11/2001 | Nakahara et al. | |
| 6,337,529 B1 | 1/2002 | Higashino et al. | |

* cited by examiner

*Primary Examiner*—A. Dexter Tugbang
*Assistant Examiner*—Tai Nguyen
(74) *Attorney, Agent, or Firm*—Baker & Daniels LLP (57) ABSTRACT

A method of manufacturing a stack of interlocked laminations in a progressive die assembly having a choke. A strip of sheet stock material is provided and a plurality of laminations are stamped therein. Each of the laminations include at least one interlock feature and include first and second regions and a connecting section extending between the first and second regions. The laminations are separated from the sheet stock material and stacked in the choke with the first and second regions in a first orientation. The laminations are also interlocked substantially concurrently with the separation and stacking of the laminations. The interlocked stack of laminations is removed from the choke with the first and second regions in their first orientation. The stack is then formed into a second shape wherein the first and second regions have a second orientation and the connecting section therebetween has been deformed.

24 Claims, 7 Drawing Sheets

FIG_11

FIG_12

METHOD OF MANUFACTURING A FORMABLE LAMINATED STACK IN A PROGRESSIVE DIE ASSEMBLY HAVING A CHOKE

BACKGROUND OF THE INVENTION

1. Field of the Invention

The present invention relates to laminated stacks and, more particularly, to stacks of interlocked laminations.

2. Description of the Related Art

The manufacture of stators, rotors and other parts employing laminated stacks is well known in the art. Typically, the laminations are blanked from a continuous strip of sheet stock material and then stacked and joined to form the stator, rotor or other part. Progressive die assemblies for producing laminations wherein a strip of lamination material is fed through a sequence of stamping or punching stations to progressively form the laminations to the desired configuration are also well known.

When forming stators and rotors for conventional electrical motors, the rotors are oftentimes punched from material removed from the center of the stator. The manufacture of electronically commutated motors, however, may involve the use of a non-laminated rotor which may result in the scrapping of material removed from the center of the stator laminations. Various known methods have been developed to form stators which do not require the removal of a large quantity of material from the center of each stator lamination when manufacturing laminated stators. Although known methods can be employed to manufacture laminated stators and other laminated parts, an improved method of manufacturing laminated parts is desired.

SUMMARY OF THE INVENTION

The present invention provides an improved method of manufacturing a stack of interlocked laminations in a progressive die assembly wherein the laminations are stacked and interlocked in a first orientation and then formed into a second orientation after removal from the choke of the progressive die.

The invention comprises, in one form thereof, a method of manufacturing a laminated stack in a progressive die assembly having a choke. The method includes providing a strip of sheet stock material and stamping a plurality of generally planar laminations from the sheet stock material in the progressive die. Each of the laminations includes at least one interlock feature, a first region, a second region and a connecting section extending between said first and second regions. The method also includes separating the laminations from the sheet stock material and stacking the plurality of laminations in the choke wherein the first and second regions are substantially coplanar and have a first relative orientation for each of the laminations positioned in the choke and wherein the connecting sections of adjacent laminations positioned in the choke are substantially aligned. The plurality of laminations are interlocked substantially concurrently with the separating and stacking of the laminations by engaging the interlock features of adjacent ones of the laminations positioned in the choke whereby the plurality of laminations form a stack of interlocked laminations within the choke. The method further includes removing the stack of interlocked laminations from the choke wherein the first and second regions remain in the first relative orientation and forming the stack of interlocked laminations into a second shape wherein for each of the laminations the first and second regions are disposed in a second relative orientation.

The invention comprises, in another form thereof, a method of manufacturing a laminated stack in a progressive die assembly having a choke. The method includes providing a strip of sheet stock material and stamping a plurality of generally planar laminations from the sheet stock material in the progressive die. Each of the laminations include at least one interlock feature, a first region, a second region and a connecting section extending between the first and second regions. The method also includes separating the laminations from the sheet stock material and stacking the plurality of laminations in the choke wherein the first and second regions are substantially coplanar and have a first relative orientation for each of the laminations positioned in the choke and wherein the connecting sections of adjacent laminations positioned in the choke are substantially aligned with each of the connecting sections having a first configuration when the first and second regions are disposed in the first relative orientation. The plurality of laminations are interlocked substantially concurrently with the separating and stacking of the laminations by engaging the interlock features of adjacent ones of the laminations positioned in the choke whereby the plurality of laminations form a stack of interlocked laminations within the choke. The method further includes removing the stack of interlocked laminations from the choke wherein the first and second regions remain in the first relative orientation and forming the stack of interlocked laminations into a second shape wherein, for each of the laminations, the first and second regions are disposed in a second relative orientation and each of the connecting sections have a second configuration.

In alternative embodiments, the above described methods may be used to form a stack of laminations wherein each of the connecting sections has a substantially smaller area than the first and second regions connected thereby. At least one of the connecting sections may be defined by two opposed substantially circular arcs whereby the at least one connecting section has an hour-glass shaped configuration.

The step of stamping a plurality of laminations may include stamping a slot and a distended tab in at least one of the laminations to define an interlock feature. Alternatively, each of the laminations may include a plurality of interlock features wherein each of the first and second regions of each of the laminations includes at least one of the plurality of interlock features. Or, each of the first and second regions of each of said laminations may include a plurality of interlock features. The interlock features may be formed by a slot or a distended tab.

The above described methods may also be used to manufacture a laminated stack wherein each of the first regions defines a substantially planar first contour after the stamping of the laminations and the first regions each retain the first contour during movement of the first regions from the first relative orientation to the second relative orientation and wherein each of the second regions defines a substantially planar second contour after the stamping of the laminations and the second regions each retain their second contour during movement of the second regions from the first relative orientation to the second relative orientation.

The first and second regions may remain substantially coplanar after forming the stack of interlocked laminations into the second shape. The methods may also include fixing the interlocked stack of laminations in the second shape. The methods may also include the further step of subjecting the stack of interlocked laminations to a secondary manufacturing process after removing the stack of interlocked laminations from the choke and before forming the stack of interlocked laminations into the second shape.

An advantage of the present invention is that it provides an efficient manufacturing method for a laminated stack, including a laminated stack that may be used to form the stator of a electronically commutated motor.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DESCRIPTION OF THE PRESENT INVENTION

Figure 1:
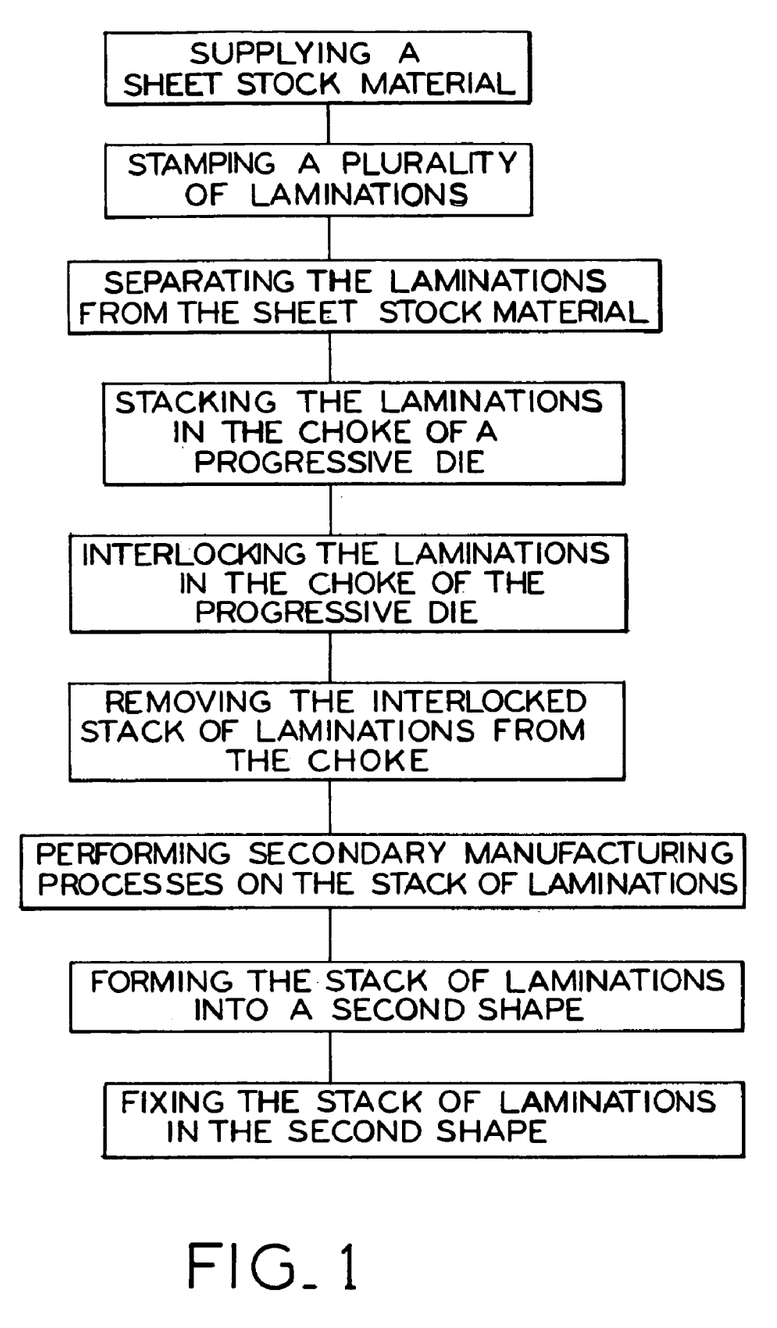
FIG. 1 is a view of a flow chart representing a manufacturing method in accordance with the present invention.
Figure 2:
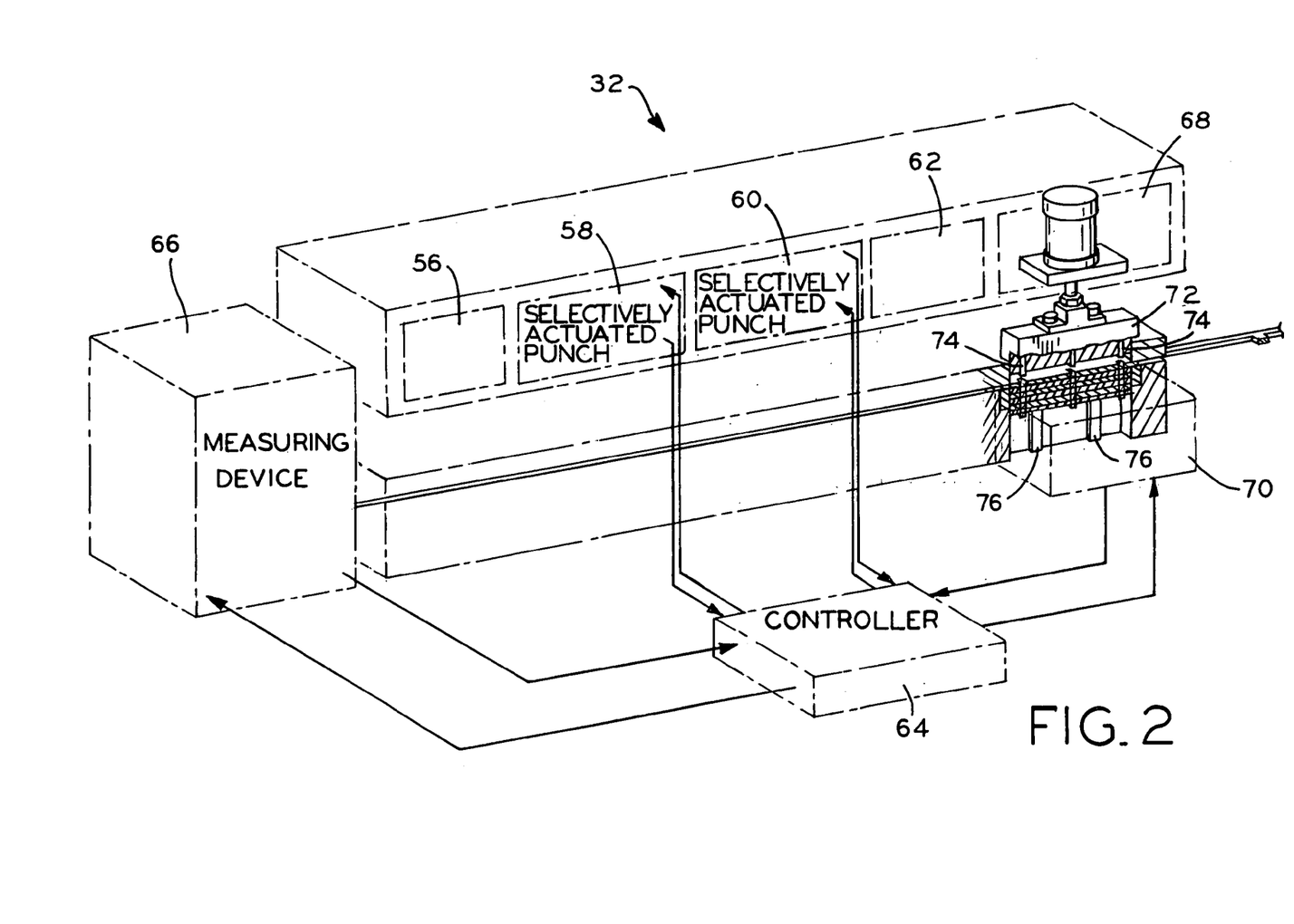
FIG. 2 is a schematic view of progressive die assembly which may be used with the present invention.

Referring now to the drawings and particularly to FIG. 1, there is shown a flow chart representing one embodiment of a manufacturing method in accordance with the present invention. With reference to FIG. 1, the represented manufacturing process includes providing a strip of sheet stock material which is fed through a progressive die assembly. The progressive die is used to stamp a plurality of generally planar laminations from the sheet stock material. The use of progressive dies to stamp laminations is well known in the art and FIG. 2 provides a schematic illustration of a progressive die assembly 32 which may be used with the manufacturing process of the current invention. Each of the laminations stamped in the sheet stock material includes at least one interlock feature, a first region, a second region and a connecting section extending between the first and second regions as discussed in greater detail below.

The laminations are separated from the sheet stock material and stacked in a choke of the progressive die assembly. The laminations are stacked such that the first and second regions of the laminations are substantially coplanar and positioned in a first relative orientation with the connecting sections of adjacent laminations being substantially aligned when the laminations are positioned in the choke. The interlock features of adjacently stacked laminations are engaged substantially concurrently as the laminations are separated from the sheet stock material and stacked in the choke to form an interlocked stack of laminations within the choke.

After a stack of interlocked laminations has been completed, it is removed from the choke with the first and second regions of each of the laminations in the first relative orientation. In some embodiments of the invention, the stack of interlocked laminations may then subjected to secondary manufacturing processes. The stack of interlocked laminations is then formed into a second shape by repositioning the first and second regions of the laminations into a second relative orientation. The stack of interlocked laminations may be fixed in the second shape if desired.

Figure 3:
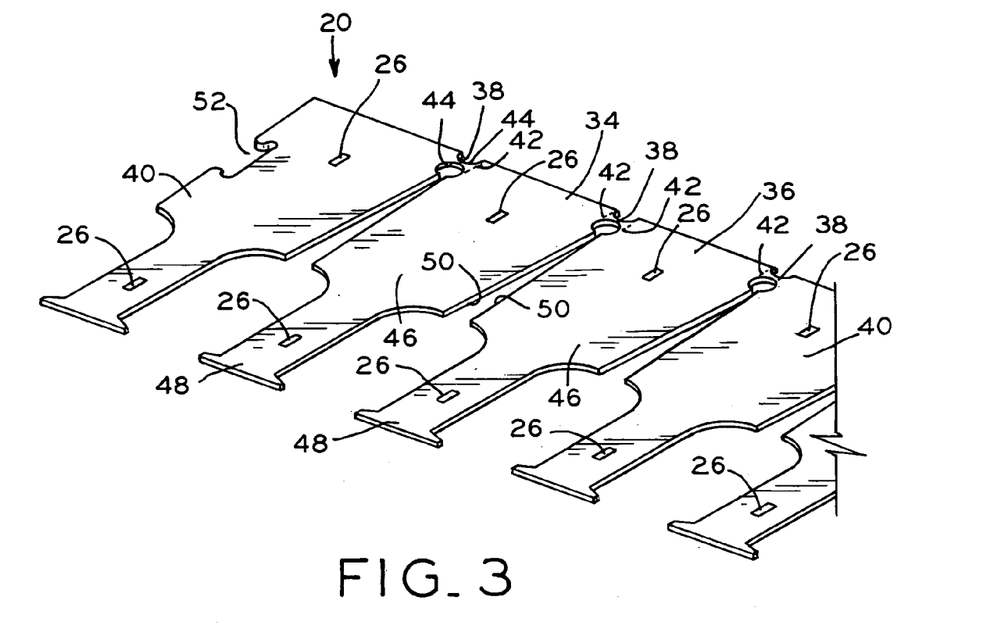
FIG. 3 is a partial perspective view of a lamination.
Figure 4:
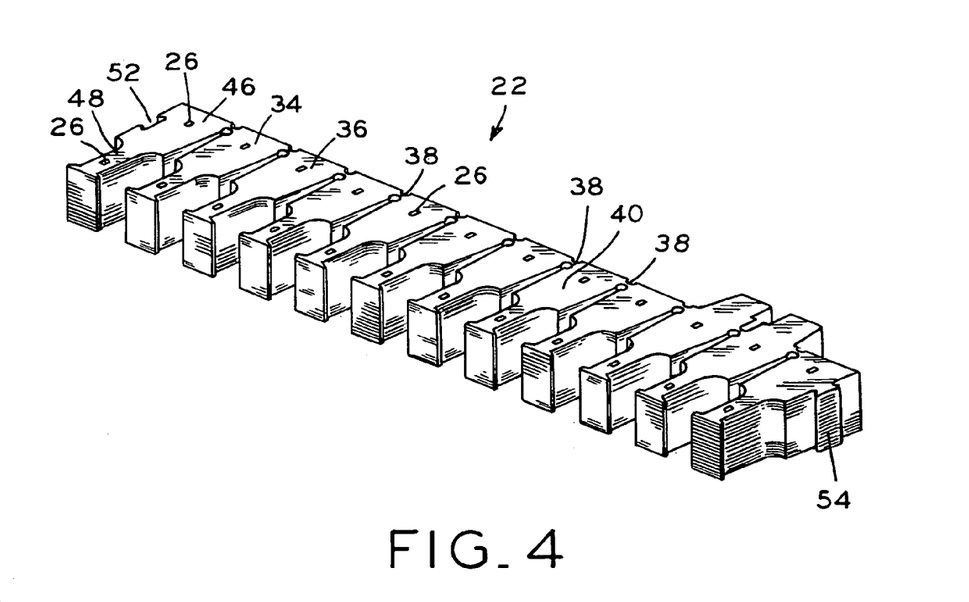
FIG. 4 is a perspective view of a stack of interlocked laminations.
Figure 5:
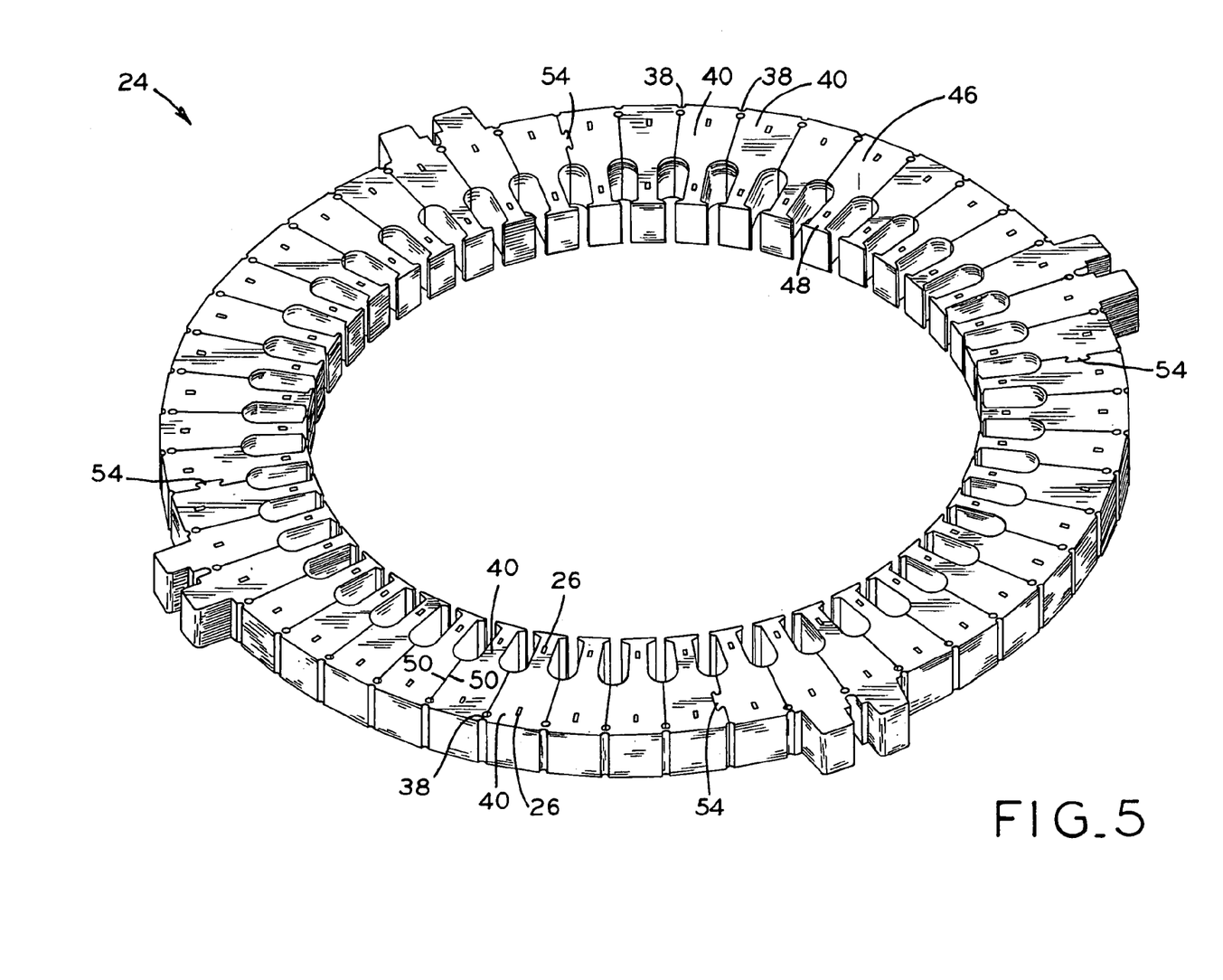
FIG. 5 is a perspective view of a plurality of stacks of interlocked laminations which have been formed into a second shape after removal from the choke of a progressive die.
Figure 11:
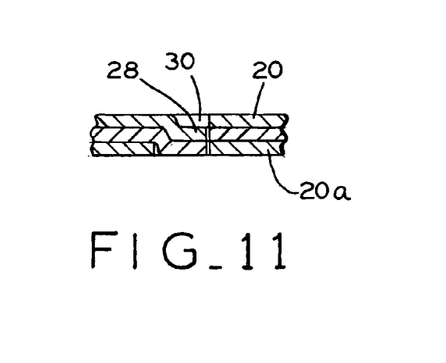
FIG. 11 is a partial cross sectional view of interlocked laminations.

With reference to FIGS. 3–5, the manufacture of a first embodiment of an interlocked stack of laminations which may be manufactured in accordance with the present invention will be described. As shown in FIGS. 3–5, individual laminations 20 are used to form an interlocked stack of laminations 22 which are, in turn, joined together to form a stator 24. With reference to FIG. 3 which illustrates a portion of a single lamination 20, laminations 20 each include interlock features 26 which, in the illustrated embodiment, are formed by stamping lamination 20 in a progressive die to form interlock tabs 28 in lamination 20 which extend below the generally planar lower surface of lamination 20 and also thereby define interlock slots 30 in lamination 20 above the interlock tabs. The use of interlock tabs 28 and slots 30 is well known in the art. Such interlock tabs extend below the generally planar lower surface of the laminations and engage slots formed in the laminations which are positioned adjacently therebelow in a stack of laminations. In lamination 20, interlock tabs 28 are formed by severing three edges of the substantially rectangular tab 28 and distending interlock tab 28 such that it may engage the next lower lamination by the entire thickness of the lamination. Each lamination of stack 22, except for the bottom lamination, has such tabs 28 formed therein. The bottom lamination of a stack 22 will include interlock slots 30 for receiving tabs 28 of the lamination positioned adjacently thereabove but will have its interlock tabs blanked, i.e., completely removed, to avoid interlocking the bottom lamination with the uppermost lamination of the stack which is positioned therebelow in the choke of the die. FIG. 11 provides a cross sectional view of three interlocked laminations 20 including a bottom lamination 20a which does not include interlock tabs 28.

Alternative interlocking features may also be employed with the present invention. For example, interlock tabs which do not include a severed edge and which extend below the lower surface of the surrounding material of the lamination by approximately ½ to ⅓ of the lamination thickness may be used to interlock the laminations. It is also known to use to interlock tabs which extend a greater distance below the lamination whereby such interlock tabs may engage the two or more immediately lower laminations in the stack. Other known methods of interlocking adjacently stacked laminations in the choke of a progressive die may also be used with the present invention.

As can be seen in FIG. 3, laminations 20 are divided into a plurality of regions 40 are joined by connecting sections 38 extending therebetween. Included among regions 40 are first region 34 and second region 36. Although two of the plurality of regions 40 are described as a first region 34 and a second region 36, the use of the terms first and second is for purposes descriptive clarity and does not imply any structural attributes to first and second regions 34 and 36. As illustrated in FIG. 3, connecting sections 38 have a substantially smaller surface area than the regions 40 which are joined by connecting sections 38. Dashed lines 42 generally indicate the location marking the boundary between connecting sections 38 and regions 40. Outer edges 44 of connecting sections 38 are defined by two substantially circular arcs. Substantially circular edges 44 of connecting sections 38 are concave whereby connecting sections 38 have a substantially hour-glass shaped configuration.

By using substantially circular arcs to define edges 44, the punches used to stamp edges 44 in progressive die 32 may intersect the adjoining edges of lamination 20 at an angle to avoid the difficulties which can arise when attempting to feather a cut into a preexisting edge of a lamination. The use of two substantially circular arcs to define edges 44 also defines a relatively small narrow area on connecting section 38 where connecting section 38 may be deformed when forming lamination stack 22 into a second configuration as discussed in greater detail below.

Regions 40 of lamination 20 include a back iron portion 46 and a pole portion 48. Back iron portions 46 are defined in part by edges 50 which form a V-shaped notch terminating at substantially circular edges 44. In the illustrated embodiment, an interlock feature 26 is located in each of the back iron portions 46 and pole portions 48. Alternatively, laminations 20 could include a lesser, or greater, number of interlock features 26. Due to the limited size and the later deformation of connecting sections 38, interlock features 26 are not located in connecting sections 38. If interlock features 26 were located in connecting sections 38, the later deformation of connecting sections 38 could result in the dislodging of the interlock features. Laminations 20 also include a T-shaped slot 52 and T-shaped tab 54 at opposite ends of lamination 20 for the later joining of stacks 22.

The shape of laminations 20 is defined as strip stock material is fed through progressive die 32 and is stamped at punching stations in the die. In the schematic illustration of progressive die 32 in FIG. 2, die 32 includes punching stations 56, 58, 60 and 62 wherein punching stations 58 and 60 are shown as selectively actuated punching stations which are controlled by a controller 64. Selectively actuated punching stations may be used to stamp features in laminations which are not common to each of the individual laminations. For example, the interlock tabs of the bottom lamination in each stack may be removed by a selectively actuated punch. A measuring device 66 is also shown in FIG. 2 and may be used to measure the thickness of the sheet stock material as it is fed into progressive die assembly 32. Measuring device 66 may be used to detect variations in the thickness of the sheet stock material. It is known to correct measured thickness variations in laminations by relatively rotating such laminations prior to the stacking of such laminations.

Progressive die assembly 32 also includes a blanking station 68 where the individual laminations stamped in the sheet stock material are separated from the sheet stock material and stacked in choke 70. A blanking punch 72 severs laminations 20 from the carrier portion of the strip stock material and presses laminations 20 into choke 70. Blanking punch 72 also includes staking punches 74 which correspond to the interlock features 26 of laminations 20 and as blanking punch 72 severs laminations 20, staking punches 74 enter interlock slots 30. As punch 72 completes its stroke, staking punches 74 press interlock tabs 28 of the lamination being severed into engagement with the slots of the uppermost lamination held in choke 70. Staking punches 74 may also help guide laminations 20 within choke 70. Laminations 20 are thereby interlocked at substantially the same time that they are separated from the carrier portion of the strip stock material and stacked in the choke of the progressive die. Carbide inserts 76 are schematically illustrated in FIG. 2 and may be used to provide a interference fit engagement with laminations 20 which have been blanked into choke 70 and thereby hold laminations 20 in choke 70.

Methods of stamping, stacking and interlocking of laminations in a progressive die assembly which may be used with the present invention are described in U.S. Pat. Nos. 5,755,023 and 5,799,387 which are both hereby incorporated herein by reference.

As laminations 20 are stacked in choke 70 to form interlocked stack 24, the plurality of regions 40, including first and second regions 34, 36, of each of the laminations 20 are substantially coplanar and have a first relative orientation illustrated in FIG. 4 which corresponds to the shape of laminations 20 as they are stamped at the punching stations of progressive die 32. As can also be seen with reference to FIG. 4, when laminations 20 are stacked within choke to form an interlocked stack 22, connecting sections 38 of the stacked laminations 20 are vertically aligned. Lamination stack 22 is removed from choke 70 of progressive die 32 while still in the first orientation shown in FIG. 4. In this first orientation, interlocked stack 22 has a substantially linear orientation.

After interlocked stack 22 has been removed from choke 70, interlocked stack 22 may be subjected to secondary manufacturing processes. For example, several interlocked stacks 22 may be joined together by engaging T-shaped slots 52 with T-shaped tabs 54 and then, while interlocked stacks 22 are still in a substantially linear orientation, interlocked stacks 22 may have insulation material applied thereto and stator windings wound around pole portions 48. Such insulation material may take the form of a liner which is inserted between pole portions 48. Insulation material may also be sprayed on the stack in the desired locations. If insulation material is sprayed on stack 22, the V-shaped notch defined by edges 50 may be masked to prevent the accumulation of insulation therein. After applying insulation and windings to interlocked stack 22, interlocked stacks 22 are then formed into a second shape shown in FIG. 5. FIG. 5 does not illustrate the insulation and stator windings.

As can be seen with reference to FIG. 5, when stacks 22 are formed into a second shape, the plurality of regions 40, including first and second regions 34, 36, are repositioned in a second relative orientation such that interlocked stacks 22 are no longer linear and have a curved shape. The forming of stacks 22 into a second shape as shown in FIG. 5 does not alter the contour or shape of the regions 40, including first and second regions 34, 36, as regions 40 are relatively moved from the first orientation shown in FIG. 4 to the second orientation shown in FIG. 5. Instead, connecting sections 38 are deformed to allow for the forming of interlocked stacks 22 into a second shape as shown FIG. 5. As interlocked stacks 22 are formed into the second orientation shown in FIG. 5, edges 50 of adjacent back iron portions 46 are brought into contact and the configuration of connecting sections 38 are altered as connecting sections 38 deform. By providing a narrow bridge such as connecting sections 38 between relatively larger regions 40, the deformation of laminations 20 can be controlled and localized in connecting sections 38. The forming of interlocked stacks 22 into a second shape is also controlled by providing edges 50 which contact each other to limit the extent to which laminations 20 are deformed.

In the illustrated embodiment of FIGS. 3–5, regions 40 of the individual laminations 20 remain coplanar as laminations 20 are stamped, stacked in choke 70, subjected to secondary manufacturing processes and subsequently formed into the second shape shown in FIG. 5. After forming interlocked stacks 22 into the second shape shown in FIG. 5, they may be fixed in this position either by relying upon the interaction of T-shaped slots 52 and T-shaped tabs 54, or, they may be more securely fixed by welding adjacent stacks 22 together. In an alternative embodiment, a single interlocked stack may be formed out of longer laminations and joined to itself to form a stator having the shape shown in FIG. 5, or, a larger or smaller number of individual stacks may be joined together to form the illustrated shape.

Figures 6, 7:
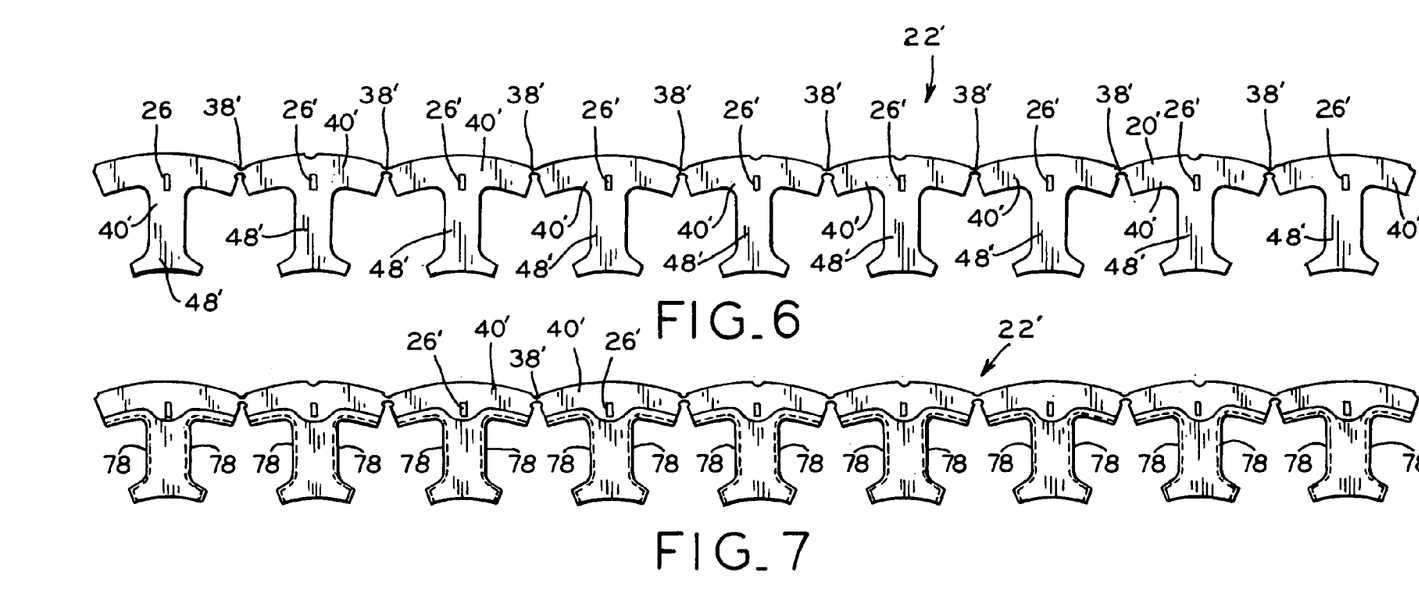
FIG. 6 is a plan view of a second embodiment of a lamination.
FIG. 7 is a plan view of a stack of interlocked laminations after insulation has been applied thereto.
Figure 8:
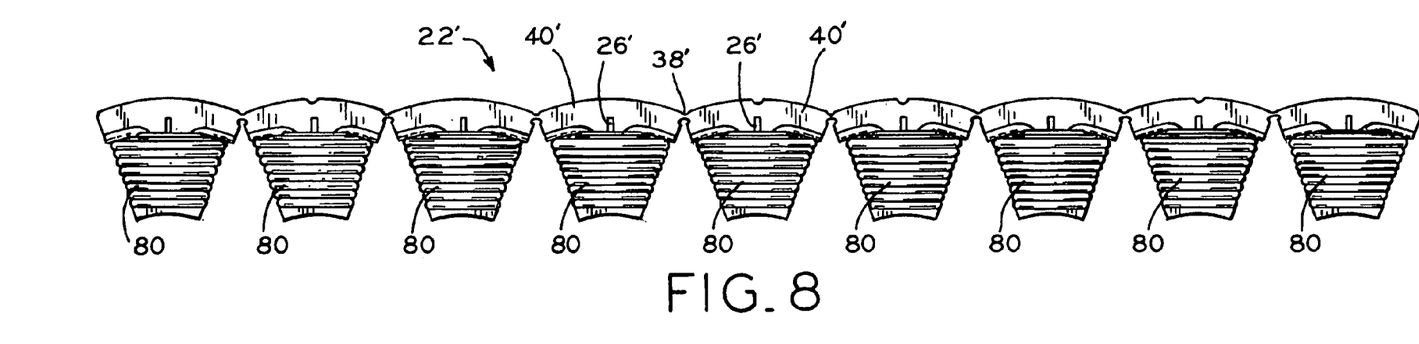
FIG. 8 is a plan view of a stack of interlocked laminations after wires have been wound thereon.

A second embodiment of an interlocked stack of laminations 22' is illustrated in FIGS. 6–9. In this embodiment, only a single interlock feature 26' is used with each of the regions 40' located between connecting sections 38'. The stamping, stacking and interlocking of laminations 20' in a progressive die in the linear orientation illustrated in FIGS. 6–7 is done in the same manner described above for laminations 20. Thus, when an interlocked stack 22' of laminations 20' are removed from the choke of a progressive die 32, the stack 22' has the first orientation shown in FIG. 6.

Similar to connecting sections 38, connecting sections 38' extend between regions 40' and define a smaller area than the adjacent regions 40'. The deformation of the individual laminations 20' is thereby localized in connecting sections 38' as interlocked stack 22' is formed into the second shape shown in FIGS. 9 and 10.

FIG. 7 schematically illustrates the application of an insulating material 78 to pole portions 48' of laminations 20' after interlocked stack 22' has been removed from the choke of a progressive die assembly. After applying insulation 78, windings 80 are wound about pole portions 48'. The use of formable stack 22' allows windings 80 to be wound on pole portions 48' while interlocked stack 22' has a substantially linear orientation. This provides advantages over the application of windings on the pole pieces of a stator which already is in its final configuration. For example, by installing windings 80 on pole portions 48' in the orientation shown in FIG. 8, a greater fill ratio in the winding slots defined between adjacent pole portions 48' may be achieved when interlocked stack 22' is formed into the second shape as illustrated in the cross sectional view of FIG. 10. The abrasion of windings 80 against the stator during winding, and the potential removal of the insulation and damage to windings, may also be reduced by installing windings 80 while interlocked stack 22' is positioned in the linear orientation shown in FIGS. 6–8.

Figure 9:
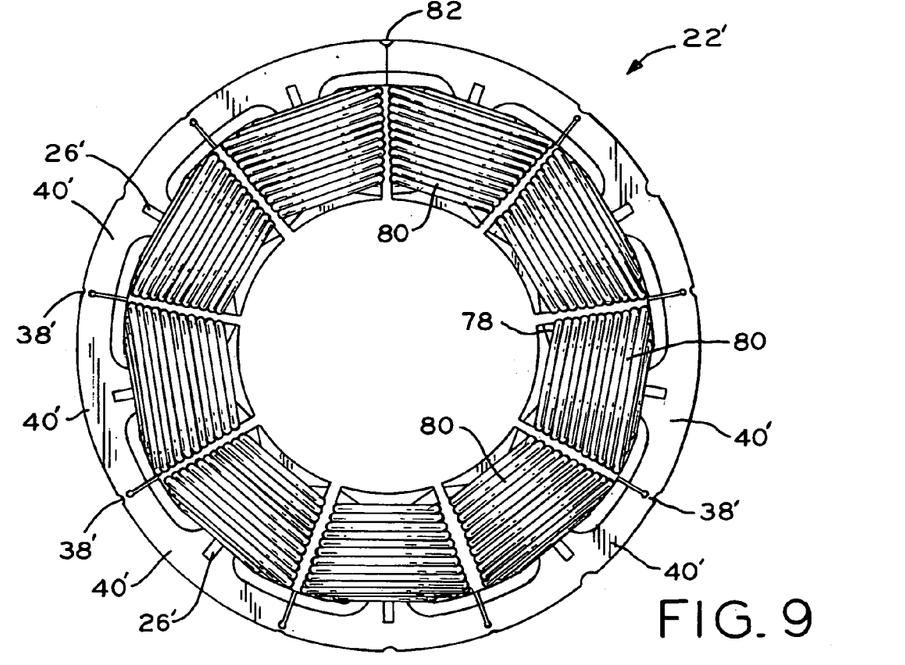
FIG. 9 is a view of a stator formed by the interlocked laminations of FIG. 8.
Figure 10:
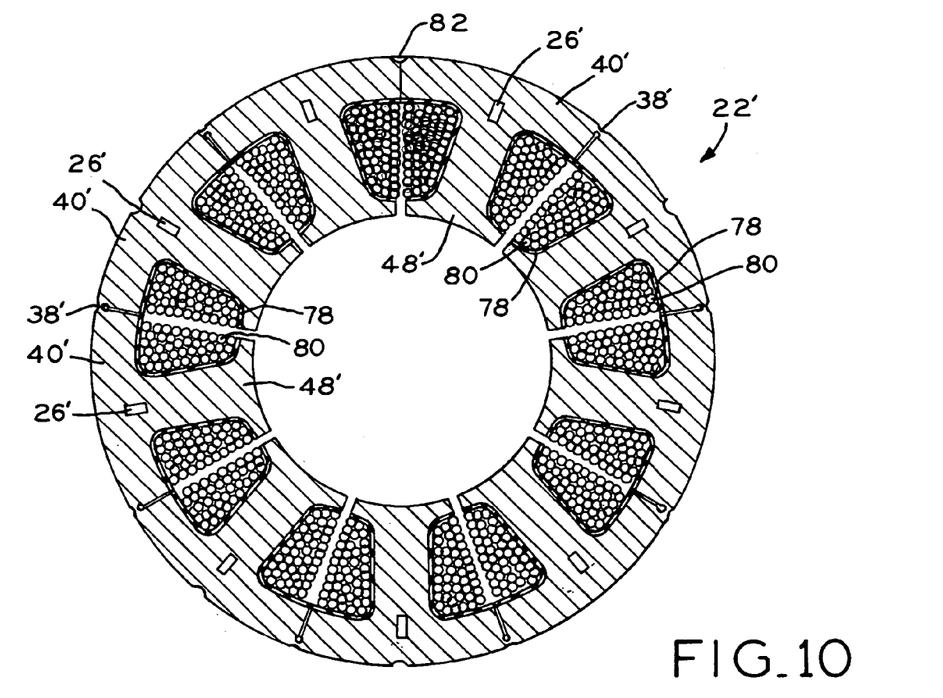
FIG. 10 is a cross sectional view of the stator of FIG. 9.

Similar to the first embodiment described above, when stack 22' is formed into a second shape, as shown in FIGS. 9 and 10, the plurality of regions 40' are repositioned in a second relative orientation such that interlocked stack 22' is no longer linear and has a substantially round shape. The forming of stack 22' into the second shape as shown in FIGS. 9 and 10 does not alter the contour or shape of the regions 40' as regions 40' are relatively moved from the first orientation shown in FIG. 6 to the second orientation shown in FIGS. 9 and 10. Instead, connecting sections 38' are deformed to allow for the forming of interlocked stack 22' into the second shape shown FIGS. 9 and 10. In the embodiment shown in FIGS. 6–10 a single interlocked stack 22' is used to form the stator illustrated in FIGS. 9 and 10 and interlocked stack 22' is fixed in the second shape by joining the opposite ends of stack 22' with weld 82.

Figure 12:
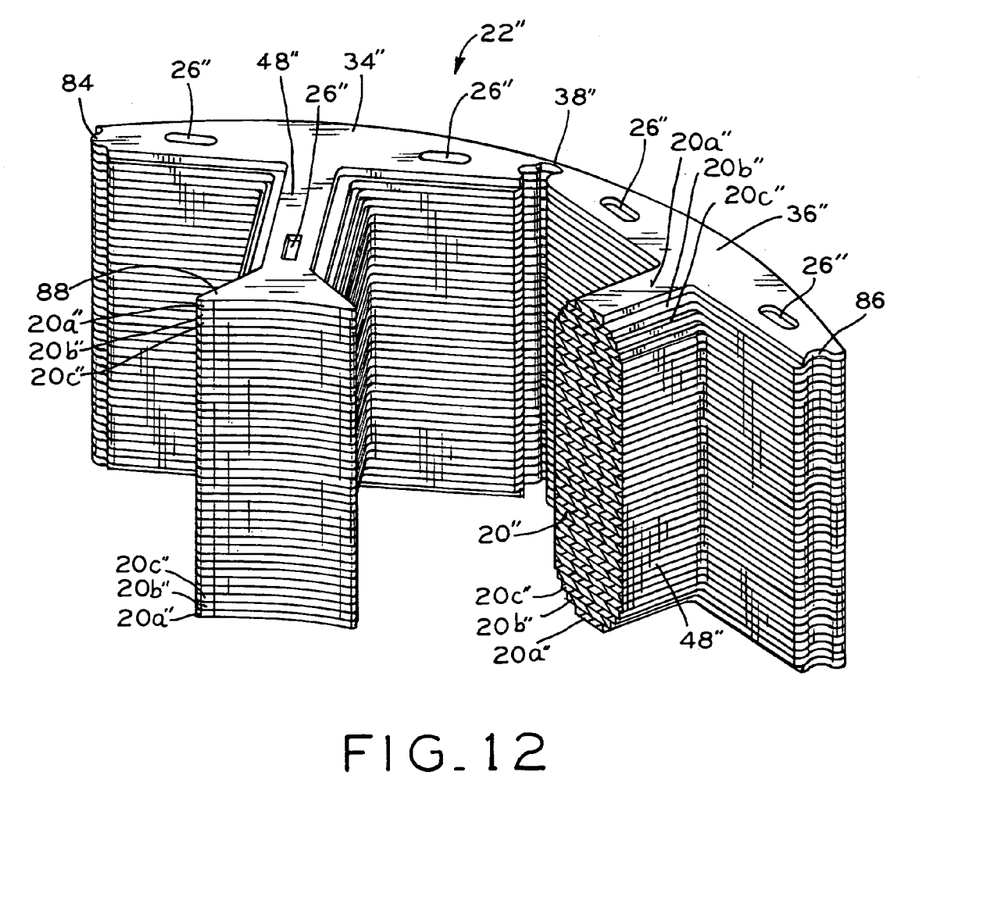
FIG. 12 is a perspective and partial cross sectional view of a stack of interlocked laminations.

Another embodiment of a stack of formable interlocked laminations is illustrated in FIG. 12. The laminations forming stack 22" include a first region 34" joined to a second region 36" by a connecting section 38" in a manner similar to the previously described stacks 22, 22'. Interlock features 26" are formed by distended interlock tabs and corresponding slots and secure adjacent laminations in stack 22" together. When stack 22" is stacked and interlocked in the choke of a progressive die in a first configuration pole pieces 48" are substantially parallel. FIG. 12 illustrates stack 22" after it has been removed from the choke and formed into a second shape wherein pole pieces 48" are no longer substantially parallel. Connecting sections 38" of stack 22" are deformed during the forming of stack 22" into the shape shown in FIG. 12 in a manner similar to the deformation of connecting sections 38, 38' described above for stacks 22, 22'.

Pole pieces 48" of stack 22" have a common configuration. FIG. 12, however, shows one pole piece 48" in cross section to better illustrate that the three uppermost and three lowermost laminations 20a", 20b" and 20c" in stack 22" have pole pieces 48" with differing widths which are narrower than the width of pole pieces 48" of laminations 20" forming the central portion of stack 22" to thereby provide rounded upper and lower edges on pole pieces 48". As can be seen in FIG. 12, lamination 20a" having the narrowest pole piece 48" is located at the top and bottom of stack 22" with laminations 20b" and 20c" having progressively wider pole pieces 48". Although the shank portion of pole pieces 48" have different widths, the tooth 88 disposed at the distal end of each pole piece 48" has a common shape and size. In other words, when the laminations forming stack 22" are stamped, the laminations forming stack 22" have a plurality of differing outer perimeters. The use of such rounded edges facilitates the application of stator windings on pole pieces 48". The stacking and interlocking of laminations having differing outer perimeters is described in U.S. Pat. No. 5,799,387 which is hereby expressly incorporated herein by reference. In accordance with the present invention, laminations having differing outer perimeters may be used to manufacture other configurations of formable interlocked lamination stacks in addition to stack 22" shown in FIG. 12.

Stack 22" includes an arcuate projection 84 and an arcuate recess 86 on opposite ends of stack 22". A plurality of stacks 22" are joined together to form a stator and arcuate projections 84 of one stack 22" are positioned within the arcuate recesses 86 of an adjacent stack 22" when forming a stator. By providing interfitting arcuate projections 84 and arcuate recesses 86, the projections 84 and recesses 86 provide a relatively large tolerance for the angle at which the adjacent stacks 22" are joined together. After interfitting projections 84 and recesses 86, the adjacent stacks 22" are securely fixed together by welding or other suitable means.

While this invention has been described as having an exemplary design, the present invention may be further modified within the spirit and scope of this disclosure. This application is therefore intended to cover any variations, uses, or adaptations of the invention using its general principles.

What is claimed is:

1. A method of manufacturing a laminated stack in a progressive die assembly having a choke, said method comprising:
providing a strip of sheet stock material;
stamping a plurality of generally planar laminations from said sheet stock material in said progressive die, each of said laminations including at least one interlock feature, a first region, a second region and a connecting section extending between said first and second regions;
separating said laminations from said sheet stock material and stacking said plurality of laminations in the choke wherein said first and second regions are substantially coplanar and have a first relative orientation for each of said laminations positioned in the choke and wherein said connecting sections of adjacent laminations positioned in the choke are substantially aligned;
interlocking said plurality of laminations substantially concurrently with said separating and stacking of said laminations by engaging said interlock features of adjacent ones of said laminations positioned in the choke wherein said plurality of laminations form a stack of interlocked laminations within the choke;
removing said stack of interlocked laminations from the choke wherein said first and second regions remain in said first relative orientation; and
forming, after said removing step, said stack of interlocked laminations into a second shape wherein for each of said laminations said first and second regions are disposed in a second relative orientation.

2. The method of claim 1 wherein each of said connecting sections has a substantially smaller area than said first and second regions connected thereby.

3. The method of claim 1 wherein at least one of said connecting sections is defined by two opposed substantially circular arcs whereby said at least one of said connecting sections has an hour-glass shaped configuration.

4. The method of claim 1 wherein said step of stamping a plurality of laminations includes stamping a slot and a distended tab in at least one of said laminations to define said at least one interlock feature.

5. The method of claim 1 wherein each of said laminations include a plurality of interlock features and each of said first and second regions of each of said laminations includes at least one of said plurality of interlock features.

6. The method of claim 5 wherein each of said first and second regions of each of said laminations includes a plurality of interlock features.

7. The method of claim 6 wherein each of said interlock features comprises at least one of a slot and a distended tab.

8. The method of claim 1 wherein each of said first and second regions are substantially coplanar after forming said stack of interlocked laminations into said second shape.

9. The method of claim 1 wherein each of said first regions defines a substantially planar first contour after said stamping of said laminations, said first regions each retaining said first contour during movement of said first regions from said first relative orientation to said second relative orientation, and wherein each of said second regions defines a substantially planar second contour after said stamping of said laminations, said second regions each retaining said second contour during movement of said second regions from said first relative orientation to said second relative orientation.

10. The method of claim 1 further comprising fixing said interlocked stack of laminations in said second shape.

11. The method of claim 10 further comprising the step of subjecting said stack of interlocked laminations to a secondary manufacturing process after removing said slack of interlocked laminations from the choke and before forming said stack of interlocked laminations into said second shape.

12. The method of claim 1 wherein said step of stamping a plurality of laminations includes stamping laminations having a plurality of different outer perimeters.

13. A method of manufacturing a laminated stack in a progressive die assembly having a choke, said method comprising:
providing a strip of sheet stock material;
stamping a plurality of generally planar laminations from said sheet stock material in said progressive die, each of said laminations including at least one interlock feature, a first region, a second region and a connecting section extending between said first and second regions;
separating said laminations from said sheet stock material and stacking said plurality of laminations in the choke wherein said first and second regions are substantially coplanar and have a first relative orientation for each of said laminations positioned in the choke and wherein said connecting sections of adjacent laminations positioned in the choke are substantially aligned, each of said connecting sections having a first configuration when said first and second regions are disposed in said first relative orientation;
interlocking said plurality of laminations substantially concurrently with said separating and stacking of said laminations by engaging said interlock features of adjacent ones of said laminations positioned in the choke wherein said plurality of laminations form a stack of interlocked laminations within the choke;
removing said stack of interlocked laminations from the choke wherein said first and second regions remain in said first relative orientation; and
forming, after said removing step, said stack of interlocked laminations into a second shape wherein for each of said laminations said fist and second regions are disposed in a second relative orientation and each of said connecting sections have a second configuration.

14. The method of claim 13 wherein each of said connecting sections has a substantially smaller area than said first and second regions connected thereby.

15. The method of claim 13 wherein at least one of said connecting sections is defined by two opposed substantially circular arcs whereby said at least one of said connecting sections has an hour-glass shaped configuration.

16. The method of claim 13 wherein said step of stamping a plurality of laminations includes stamping a slot and a distended tab in at least one of said laminations to define said at least one interlock feature.

17. The method of claim 13 wherein each of said laminations include a plurality of interlock features and each of said first and second regions of each of said laminations includes at least one of said plurality of interlock features.

18. The method of claim 17 wherein each of said first and second regions of each of said laminations includes a plurality of interlock features.

19. The method of claim 18 wherein each of said interlock features comprises at least one of a slot and a distended tab.

20. The method of claim 13 wherein each of said first and second regions are substantially coplanar after forming said stack of interlocked laminations into said second shape.

21. The method of claim 13 wherein each of said first regions defines a substantially plain first contour after said stamping of said laminations, said first regions each retaining said first contour during movement from said first relative orientation to said second relative orientation, and wherein each of said second regions defines a substantially planar second contour after said stamping of said laminations, said second regions each retaining said second contour during movement from said first relative orientation to said second relative orientation.

22. The method of claim 13 further comprising fixing said interlocked stack of laminations in said second shape.

23. The method of claim 22 further comprising the step of subjecting said stark of interlocked laminations to a secondary manufacturing process after removing said stack of interlocked laminations from the choke and before forming said slack of interlocked laminations into said second shape.

24. The method of claim 13 wherein said step of stamping a plurality of laminations includes stamping laminations having a plurality of different outer perimeters.

* * * * *